UNITED STATES PATENT OFFICE.

WILLIAM HOOPES, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA.

CHARGE OR BLOCK FOR USE IN PRACTICING PROCESSES INVOLVING CHEMICAL REACTIONS, MORE PARTICULARLY REACTIONS BETWEEN SOLID AND GASEOUS BODIES, AND PROCESS OF MAKING THE SAME.

1,415,036.   Specification of Letters Patent.   Patented May 9, 1922.

No Drawing.   Application filed September 19, 1919. Serial No. 324,767.

*To all whom it may concern:*

Be it known that I, WILLIAM HOOPES, a citizen of the United States of America, and a resident of Pittsburgh, in the county of Allegheny and State of Pennsylvania, have invented an improvement in charges or blocks for use in practicing processes involving chemical reactions, more particularly reactions between solid and gaseous bodies, and processes of making the same, of which the following description, in connection with the accompanying drawings, is a specification, like characters on the drawings representing like parts.

This invention relates to charges for use in practicing processes involving chemical reactions, and more particularly to those involving chemical reactions between solid and gaseous bodies.

In carrying out reactions of the general character described, the charge is usually placed in the reaction chamber of a furnace or other apparatus in which the reaction is to take place, and the necessary heat is then supplied to the charge while the gaseous body that is to take part in the reaction is being conducted into the reaction chamber so that it may permeate the charge.

In accordance with my invention, I prepare the charge so as to insure throughout the entire mass thereof an intimate, and so far as practicable, uniform contact between the different solid components of the charge and between said solid materials and the gaseous body used in the reaction. To this end I thoroughly mix the solid materials together, they having previously been reduced to a relatively finely comminuted state, if they are not already in that condition, and with the mixture thus obtained I also preferably thoroughly mix a suitable binder. This mixing of the ingredients of the charge and the binder may be effected in any suitable manner and in any of the many well-known mixing machines on the market, as will be readily understood by those skilled in the art without further description. Although any suitable binding material may be used, according to the nature of the substances composing the charge, I preferably use a material that will serve to bind the particles of the charge when it is heated. When the charge contains carbon as a requisite and substantial portion thereof, a suitable binding material is tar or pitch.

When the binder and the materials of the charge have thus been thoroughly intermixed, I preferably form the mixture into blocks to render it self-sustaining. These blocks may be cylindrical, polygonal, or of any other suitable shape, and of any size desired. The blocks may be of such a size, for example, that a single block will constitute the whole charge, or the blocks may be of such a size that a plurality thereof are required to form a charge, the blocks in the latter case being stacked up or otherwise arranged in any suitable manner within the reaction chamber of the furnace or other apparatus in which the reaction is to be effected.

To form the mixture into blocks, I bake the mixture while it is maintained in the form which it is desired that the blocks shall assume, and to this end I preferably bake the mixture in molds or forms of the shape desired, although any other means for maintaining the mixture in the form desired for the blocks during the baking operation may be used. The mixture is poured into the forms and will then preferably be compressed therein.

The object of compressing the charge is to impart to the finished block the strength necessary to enable it to preserve its shape and prevent it from crumbling or breaking either during or after the reaction for which it is used, so that it can be readily handled after the reaction as well as before without breaking. It is not for the purpose of compacting the mixture, as this would deprive the block of the necessary porosity and consequent permeability to gases. Only such a degree of pressure should, therefore, be used as will impart to the formed block the necessary strength, while preserving the maximum porosity possible. I preferably use a pressure of from about 20 lbs. to 50 lbs. to the square inch which pressure I have found will attain both of these objects. I do not, however, limit my invention to the degree of pressure specified, as the pressure necessary to secure the results specified may vary according to the materials of which the block is composed and other circumstances.

Blocks formed from the relatively slightly compressed or uncompacted mixture, as described, are still permeable to gases in a high degree, thus readily permitting the reaction to take place.

Any suitable means may be used for compressing the mixture, and any suitable forms may be used for baking the blocks, as will be readily understood by those skilled in the art.

By baking of the blocks most of the volatile components of the tar or pitch are driven off, and the fixed carbon remaining from the distillation of the binder binds the particles of the charge to each other, thus rendering the whole mass of the block self-sustaining. Furthermore, the distillation of the binder adds to the porosity of the charge, so that when subjected to the action of the gaseous body, the whole mass of the block will be more readily permeated by the latter, thus insuring intimate contact between the solid and gaseous bodies throughout the entire charge, and that the reaction shall take place in all parts thereof. This porosity of the charge also facilitates the elimination of any gaseous products of the reaction for which the blocks are intended.

The blocks made in accordance with my invention are particularly advantageous where the heat necessary to the reaction for which they are intended, is supplied by electrical energy, on the resistance principle of heating, the charge forming a conductive path between suitable electrodes connected with any suitable supply of electric current. Where electrical energy is thus used to supply the heat necessary for the reaction, it is highly advantageous that the charge shall be maintained out of contact with the walls of the reaction chamber or other surrounding objects, because at the relatively high temperatures used in many reactions the walls of the furnace, or other objects surrounding the charge, are liable to become electrically conductive, so that a portion of the current, instead of passing through the charge, leaks wastefully around the charge by passing through the surrounding walls or other objects when the charge is in contact therewith. Furthermore, where the charge is in direct contact with the walls of the reaction chamber, or with other surrounding objects, these walls or objects become considerably hotter than they would otherwise, and are thus liable to be damaged through fusion or chemical attack by ingredients of the charge. However, by using the self-sustaining blocks made in accordance with my invention, these may be disposed within the reaction chamber so as to form a conductive path between the electrodes, while being entirely out of contact with the walls of the reaction chamber or any other surrounding objects, whereby the disadvantages above referred to are avoided.

In order to facilitate the permeation of the blocks by the gas to be used in the reaction, said blocks may be cored. This applies more particularly to the larger sizes of blocks, which may thus be provided with one or more gas passages.

I will now describe more in detail the best mode or manner now known to me for practicing my invention, in its application to the production of blocks to be used in the manufacture of a specific substance, more particularly aluminum nitride. It is to be understood, however, that my invention is not limited to the production of blocks for making this substance; but that as to its general features, and as to certain of its specific features as well, it is equally applicable to the production of blocks comprising ingredients for the manufacture of other substances including other nitrides.

For producing blocks for making aluminum nitride I preferably use calcined bauxite to which I add a suitable proportion of a reducing agent and a suitable proportion of a binder which will serve to bind the particles of the mixture together when it is heated. Instead of bauxite any aluminous material or compound could be used, such, for example, as the aluminous residue from alunite, after the extraction of the potash therefrom, or kaolin, or any clay of high alumina content. The amount of silica contained in clays, however, makes them less desirable from the commercial standpoint, although it is possible to use them. A suitable binding material is tar or pitch. If pitch is used, it is convenient to use it in a pulverized form. Any suitable reducing agent may be used, but I preferably use a carbonaceous material, such as coke or coal, and if coal is used I have found it preferable to use low-ash bituminous coal.

The ingredients may be mixed in any suitable proportion. When coke and tar are used I preferably mix the ingredients in the proportions of 50 lbs. of powdered bauxite, 25 lbs. of coke, and 25 lbs. of tar. I do not, however, limit myself to these exact proportions.

I preferably use by-product coke, but any suitable coke may be used.

The bauxite and coke are first reduced to a relatively finely comminuted state, if they are not already in that condition; preferably to a fineness that will enable about 80% to pass through a 100-mesh sieve, although considerable latitude is permissible in this respect. The bauxite, coke and tar are then thoroughly mixed together. This may be done in any suitable manner, for example in any well-known mixing machine. I preferably use a steam-jacketed mixing machine of any usual construction. Into this the mixture of bauxite and coke is preferably first run, and when this mixture has assumed the temperature of the mixer, about 110° C., the tar is then added and the whole thoroughly mixed. The hot mixture is then placed in molds of the shape and size desired. The mixture in the molds is then slightly compressed, the pressure used being from about 20 lbs. to about 50 lbs. to the square inch, but the pressure may vary so long as the mixture is not unduly compacted. This may conveniently be done by placing the molds in a hydraulic or other suitable press of any well-known construction. The molds are then placed in a suitable furnace and their contents baked to form the self-sustaining blocks. The temperature used may vary within considerable limits, according to circumstances, but I have found that, as a general rule, a temperature of about 600° C. gives good results. I prefer to conduct the baking slowly, devoting about 15 hours to the whole operation; namely, about 5 hours to bring the molds and their contents to approximately 600° C., about 5 hours during which they are maintained at approximately that temperature, and about 5 hours to allow them to cool, when they are removed from the furnace. The time devoted to the baking operation may vary, however. On being taken from the molds the blocks are ready for use. The baking should be conducted in a reducing atmosphere. This is taken care of by the products of distillation of the tar; a cover, loosely placed over the open tops of the molds preventing the entrance of air into the molds, while allowing the products of distillation to escape therefrom.

Blocks baked as above at a temperature of about 600° C. are poor conductors of electricity at normal temperature, owing to the imperfect distillation of the pitch or tar binder at the baking temperature used, but will become electrically conductive on being heated. I have found, however, that if the blocks be baked at a temperature sufficiently high to effect a relatively complete distillation of the pitch or tar, a temperature of about 1000° C. for example, the resultant blocks will be electrically conductive at normal temperatures or when cold.

As already stated, the forms may be of any suitable size or shape, according to the size or shape that it is desired to give the blocks. For making aluminum nitride I prefer to make the blocks about 12 inches cube.

When the baking is completed, most of the volatile components of the pitch and coal will have been driven off, and the fixed carbon remaining from the distillation binds the particles of the mixture in the form to each other in such a manner that the whole mass in the form becomes self-sustaining.

I have found by experiment that blocks made in accordance with my invention are permeated by gases to any depth, the extent and rapidity of the penetration being a function of time and the nature of the reaction being carried on.

From the commercial standpoint it is desirable to reduce the time necessary for the completion of the reaction as much as practicable, and I therefore find it convenient to core the blocks in order to expedite the penetration of the whole mass of the block by the gas. Accordingly, in the case of the block having the form of a twelve inch cube, above referred to, I provide a central core, about four inches in diameter, substantially coaxial with the block. In blocks of larger size, I may provide a larger core hole or a plurality of core holes, the size of number varying according to the size of the charge or block, and the core holes being so disposed relative to each other and to the outer surfaces of the charge or block, that the thickness of the material separating the holes from one another and from the outer surfaces of the charge or block, respectively, will be a minimum.

This coring may be effected in any suitable manner, or by any suitable means, as by providing the necessary cores in the molds or forms in which the baking of the mixture is effected, or by boring out the core holes in the block after the latter has been baked. Where the coring is done by cores placed in the molds, the cores are preferably withdrawn after the mixture has been compressed in the mold, and the core holes filled with sand to prevent the mixture from collapsing into the core holes during the baking operation.

When removed from the form after being baked, the blocks are self-sustaining and can be handled without danger of breakage. They also preserve their form and self-sustaining quality during and after the heating in the furnace, in the presence of a nitrogen-containing gas, to form the aluminum nitride, in spite of the high temperature to which they are subjected during said reaction.

The blocks thus form a charge that is much more readily removable from the furnace, and much more easily handled than the ordinary charge poured into the reaction chamber; and the aluminum nitride formed in the blocks by heating them as described, in a furnace in the presence of a nitrogen-containing gas, is recovered more readily and with less waste than in the case of other forms of charges hitherto used.

From the above description those skilled in the art will recognize the advantages possessed by the blocks made in accordance with my invention, over other charges heretofore used.

Thus, while blocks made in accordance with my invention may be used in furnaces other than electric furnaces, they are peculiarly well adapted for carrying out the reaction in an electric furnace, in which electrical energy is used to supply the heat necessary to the reaction; the block or blocks forming a conductive path between suitable electrodes connected to any suitable electrical supply, as in that case they can be arranged out of contact with the furnace walls and thus avoid waste of current and injury to said walls owing to the conductivity of the latter at high temperatures. Furthermore, where electric current is thus used to supply the heat for the reaction, substantially uniform heating of the charge and consequent uniform electrical conductivity throughout all parts of the latter is assured so long as an endothermic reaction is proceeding, on condition that the materials for the reaction be everywhere present in the charge in quantities and under conditions to enable the reaction to proceed freely in all parts of the charge. This my invention assures owing to the intimate and substantially uniform intermixture of the ingredients of the block throughout the entire mass of the latter, and the high degree of porosity of the block throughout, whereby intimate and so far as practicable uniform contact is assured between the solid and gaseous bodies used in the reaction, throughout the entire mass of the block, and fresh gas can always permeate any and all parts of the latter to take the place of that absorbed by the reaction. The heat necessary for the reaction will thus be developed throughout the entire charge wherever it is required and in suitable quantity continuously to supply that absorbed by the reaction.

So far as practicable, uniform heating of the charge throughout is thus assured and overheating thereof during the reaction is precluded, providing that the rate of input of electrical energy is kept within certain limits, readily determined by experiment; this rate being substantially equal to the sum of the heat absorbed by the reaction plus the unavoidable heat losses, the temperature being thus maintained within the desired limits.

Where the charge is not substantially uniformly heated, the electric current, owing to the greater conductivity of the hotter portions of the charge, is liable to concentrate at said hotter portions. The temperature of the hotter portions of the charge is thus liable to rise to the fusion point of the mixture, the resulting fused masses cutting off the supply of gas from adjacent parts of the charge, thus materially curtailing, if not wholly preventing, the reaction at those parts. The uniform heating of the charge in accordance with my invention precludes this and insures that the reaction will take place practically uniformly in all parts of the charge, thus insuring a very high production of the product which it is sought to obtain.

Other advantages secured by my invention, in addition to those here specifically pointed out, will appear to those skilled in the art.

Obviously, this invention is not limited to the specific details of procedure above described for illustration, nor is it limited in its application to any particular apparatus or means for practicing the same, although the process embodying the invention is especially well adapted to be practised by the apparatus herein referred to. It is to be understood, further, that it is not indispensable that all the features of the invention be employed in a single process, since the features of the invention may be used to advantage separately, as defined in the subjoined claims.

Claims

1. A charge or block of the class described consisting of a self-sustaining body formed of intercoherent but substantially uncompacted mixture of materials and characterized by its capability of retaining its self-sustaining qualities at relatively high temperatures and by a porosity which renders it readily permeable to gases.

2. A charge or block of the class described consisting of a substantially uncompacted self-sustaining body formed of a mixture of materials rendered intercoherent by a set binder and characterized by its capability of retaining its self-sustaining qualities at relatively high temperatures and by a porosity which renders it readily permeable to gases.

3. A charge or block of the class described consisting of a substantially uncompacted self-sustaining, cored body formed of a mixture of materials rendered intercoherent by a set binder and characterized by its capability of retaining its self-sustaining qualities at relatively high temperatures and by a porosity which renders it readily permeable to gases.

4. A charge or block of the class described consisting of a substantially uncompacted self-sustaining body formed of a mixture of fine particles of a suitable aluminous material and of a suitable reducing agent rendered intercoherent by a set binder and characterized by its capability of retaining its self-sustaining qualities at relatively high temperatures and by a porosity which renders it readily permeable to gases.

5. A charge or block of the class described consisting of a substantially uncompacted self-sustaining body formed of a mixture of fine particles of an aluminium-bearing mineral and of carbon bound together by distilled pitch or tar and characterized by its capability of retaining its self-sustaining qualities at relatively high temperatures and by a porosity which renders it readily permeable to gases.

6. A self-sustaining charge or block of the class described, provided with one or more cored passages and consisting of a compressed and baked mixture of the materials composing the same, including a suitable binder, in suitable proportions, said charge or block being capable of retaining its self-sustaining qualities at relatively high temperatures and of a porosity to be readily permeable to gases.

7. A self-sustaining charge or block of the class described, comprising a baked mixture of relatively finely comminuted bauxite and coke with tar in the proportions of about 50 lbs. of bauxite, about 25 lbs. of coke, and about 25 lbs. of tar, said charge or block being of a porosity to be permeable to gases.

8. A self-sustaining charge or block of the class described, provided with one or more cored passages and comprising a baked mixture of relatively finely comminuted bauxite and coke with tar, in the proportions of about 50 lbs. of bauxite, about 25 lbs of coke, and about 25 lbs. of tar, said charge or block being of a porosity to be permeable to gases.

9. A self-sustaining charge or block of the class described, provided with one or more cored passages and comprising a compressed and baked mixture of a suitable aluminous material and coke or coal, reduced to a relatively finely comminuted state, and pitch or tar, in suitable proportions, said charge or block being of a porosity to be permeable to gases.

10. A self-sustaining charge or block of the class described, comprising a compressed and baked mixture of relatively finely comminuted bauxite and coke with tar, in the proportions of about 50 lbs. of bauxite, about 25 lbs. of coke, and about 25 lbs. of tar, said charge or block being of a porosity to be permeable to gases.

11. A self-sustaining charge or block of the class described, provided with one or more cored passages and comprising a compressed and baked mixture of relatively finely comminuted bauxite and coke with tar, in the proportions of about 50 lbs. of bauxite, about 25 lbs. of coke, and about 25 lbs. of tar, said charge or block being of a porosity to be permeable to gases.

12. In a self-sustaining charge or block of the class described, having the form of a 12-inch cube provided with a substantially central gas passage, about four inches in diameter, and comprising a compressed and baked mixture of relatively finely comminuted suitable aluminous material and coke or coal, with pitch or tar, said charge or block being of a porosity to be permeable to gases.

13. A self-sustaining charge or block of the class described, having the form of a 12-inch cube provided with a substantially central gas passage about four inches in diameter, and comprising a compressed and baked mixture of relatively finely comminuted bauxite and coke, and tar, in the proportions of about 50 lbs. of bauxite, about 25 lbs. of coke, and about 25 lbs. of tar, said charge or block being of a porosity to be permeable to gases.

14. A self-sustaining charge or block of the class described, having the form of a 12-inch cube provided with a substantially central gas passage about four inches in diameter, and comprising a baked mixture of aluminous material and coke or coal, reduced to a relatively finely comminuted state, and pitch or tar, in suitable proportions, the mixture being compressed under a pressure of from about 20 lbs. to about 50 lbs. to the square inch, said charge or block being of a porosity to be permeable to gases.

15. A self-sustaining charge or block of the class described, having the form of a 12-inch cube provided with a substantially central gas passage about four inches in diameter, and comprising a baked mixture of bauxite and coke, reduced to a relatively finely comminuted state, and tar, in the proportions of about 50 lbs. of bauxite, about 25 lbs. of coke, and about 25 lbs. of tar, the mixture being compressed under a pressure of from about 20 lbs. to about 50 lbs. to the square inch, said charge or block being of a porosity to be permeable to gases.

16. That process of preparing a block for treatment by gas in chemical reaction which comprises compressing finely divided solid material with a partly volatilizable binder to effect coherence thereof without substantial densification and heating the same to set said binder whereby to provide an uncompacted previous block.

17. That process of preparing a block for treatment with a nitrogenous gas in the manufacture of aluminum nitride which comprises compressing finely divided bauxite and carbon with a bituminous binder to effect coherence without substantial densification and heating the same to set the binder, the heating being carried to an elevated temperature to give the block permanent electrical conductivity as set forth.

18. That process of preparing a block for treatment with a nitrogenous gas in the manufacture of aluminum nitride characterized by the step of heating a mixture of aluminum bearing and carbon bearing materials at a relatively elevated temperature to provide a block having permanent electrical conductivity.

19. A process of making a charge or block of the class described, which comprises compressing, baking and coring a mixture, in suitable proportions, of the relatively finely comminuted ingredients of the same, including a suitable binder, to form said mixture into a self-sustaining and cored charge or block of a porosity to be permeable to gases.

20. A process of making a charge or block of the class described, which comprises compressing a mixture of suitable proportions of the relatively finely comminuted ingredients of the same, including a suitable binder, in a form or mold; and baking said mixture in said form or mold to form it into a self-sustaining charge or block of a porosity to be permeable to gases.

21. A process of making a charge or block of the class described, which comprises compressing a mixture of suitable proportions of the relatively finely comminuted ingredients of the same, including a suitable binder, in a form or mold; baking said mixture in said form or mold to form it into a self-sustaining charge or block of a porosity to be permeable to gases; and coring said charge or block.

22. A process of making a charge or block of the class described, which comprises thoroughly intermixing a suitable, relatively finely comminuted aluminous material, a suitable proportion of relatively finely comminuted coke or coal, and a suitable proportion of a suitable binder; and baking the mixture thus obtained in a form or mold to form it into a self-sustaining charge or block of a porosity to be permeable to gases.

23. A process of making a charge or block of the class described, which comprises compressing a mixture of a suitable, relatively finely comminuted aluminous material, a suitable proportion of relatively finely comminuted coke or coal, and a suitable proportion of pitch or tar; and baking said mixture to form it into a self-sustaining charge or block of a porosity to be permeable to gases.

24. A process of making a charge or block of the class described, which comprises compressing a mixture of a suitable, relatively finely comminuted aluminous material, a suitable proportion of relatively finely comminuted coke or coal, and a suitable proportion of pitch or tar; baking said mixture to form it into a self-sustaining charge or block of a porosity to be permeable to gases; and providing said charge or block with one or more cored passages.

25. A process of making a charge or block of the class described, which comprises compressing and baking a mixture of bauxite, coke, and tar, in the proportions of about 50 lbs. of bauxite, about 25 lbs. of coke, and about 25 lbs. of tar, to form thereof a self-sustaining charge or block of a porosity to be permeable to gases.

26. A process of making a charge or block of the class described, which comprises compressing and baking a mixture of bauxite, coke, and tar, in the proportions of about 50 lbs. of bauxite, about 25 lbs. of coke, and about 25 lbs. of tar, to form thereof a self-sustaining charge or block of a porosity to be permeable to gases; and providing said charge or block with one or more cored passages.

27. A process of making a charge or block of the class described, which comprises compressing and baking a mixture of suitable proportions of bauxite, coke or coal, and tar or pitch to form said mixture into a charge or block having the shape of a 12-inch cube of a porosity to be permeable to gases; and at some time in the process providing said charge or block with a substantially central gas passage about four inches in diameter.

28. A process of making a charge or block of the class described, which comprises compressing a mixture of bauxite, coke and tar, in the proportions of about 50 lbs. of bauxite, about 25 lbs. of coke, and about 25 lbs. of tar under a pressure of from about 20 lbs. to about 50 lbs. to the square inch, and baking said mixture to form it into a self-sustaining charge or block having the shape of a 12-inch cube and of a porosity to be permeable to gases; and at some time in the process providing said charge or block with a substantially central gas passage about four inches in diameter.

29. A charge or block of the class described comprising a mixture of suitable proportions of the ingredients composing the same, including a binder, said mixture being compressed and baked at a temperature of approximately 1000° C. to form it into a self-sustaining, electrically conductive charge or block of a porosity to be permeable to gases.

30. A charge or block of the class described comprising a mixture of suitable proportions of the ingredients composing the same, including a binder, said mixture being compressed and baked at a temperature of at least about 600° C. but not substantially exceeding 1000° to form it into a self-sustaining charge or block of a porosity to be permeable to gases.

In testimony whereof, I have signed my name to this specification.

WILLIAM HOOPES.